United States Patent
Yang

(10) Patent No.: US 12,472,797 B2
(45) Date of Patent: Nov. 18, 2025

(54) ADJUSTMENT KNOB FOR VEHICLE AIR VENT

(71) Applicant: NIFCO KOREA INC., Asan-si (KR)

(72) Inventor: Ki Mok Yang, Chungcheongnam-do (KR)

(73) Assignee: NIFCO KOREA INC., Asan-si (KR)

( * ) Notice: Subject to any disclaimer, the term of this patent is extended or adjusted under 35 U.S.C. 154(b) by 520 days.

(21) Appl. No.: 17/784,002

(22) PCT Filed: Dec. 10, 2020

(86) PCT No.: PCT/KR2020/018019
§ 371 (c)(1),
(2) Date: Jun. 9, 2022

(87) PCT Pub. No.: WO2021/118245
PCT Pub. Date: Jun. 17, 2021

(65) Prior Publication Data
US 2023/0025043 A1 Jan. 26, 2023

(30) Foreign Application Priority Data
Dec. 11, 2019 (KR) .................. 10-2019-0165038

(51) Int. Cl.
*F24F 13/08* (2006.01)
*B60H 1/00* (2006.01)
*B60H 1/34* (2006.01)

(52) U.S. Cl.
CPC ......... *B60H 1/0065* (2013.01); *B60H 1/3421* (2013.01); *B60H 2001/3471* (2013.01)

(58) Field of Classification Search
CPC ............... B60H 1/0065; B60H 1/3421; B60H 2001/3471; B60H 1/34; B60H 1/3414
(Continued)

(56) References Cited

U.S. PATENT DOCUMENTS

| 9,073,407 B2 | 7/2015 | Kober et al. |
| 10,266,032 B2 | 4/2019 | Lim |
| 10,792,982 B2 | 10/2020 | Lee et al. |
| 2007/0111653 A1* | 5/2007 | Endou ................. B60H 1/3421 454/155 |

(Continued)

FOREIGN PATENT DOCUMENTS

| CN | 105813868 A | 7/2016 |
| CN | 207291598 U | 5/2018 |

(Continued)

OTHER PUBLICATIONS

Haraga, Shinichi, JPH10250357 Translation.pdf, "Wind direction adjusting device", Sep. 1998, pp. 1-11.*

(Continued)

*Primary Examiner* — Avinash A Savani
*Assistant Examiner* — Ryan L Faulkner
(74) *Attorney, Agent, or Firm* — Thomas| Horstemeyer, LLP

(57) ABSTRACT

An adjustment knob for rotating a horizontal vane and a vertical vane of a motor vehicle air vent is provided. The adjustment knob includes a knob body coupled to the horizontal vane to be movable in a horizontal direction and a vane rotating portion that rotates the vertical vane by movement of the knob body. An inserting gap, into which the horizontal vane is inserted in a frontward direction, and a receiving gap, which is enlarged from the inserting gap, are penetrated through the knob body in the horizontal direction. The vane rotating portion is fixed to a rear end of the knob body below the inserting gap. The knob body is coupled to the horizontal vane such that a front end of the horizontal vane is positioned in the receiving gap and the vane rotating portion is adjacent to a rear end of the horizontal vane.

7 Claims, 8 Drawing Sheets

(58) Field of Classification Search
USPC .......................................................... 454/155
See application file for complete search history.

(56) References Cited

U.S. PATENT DOCUMENTS

| | | | |
|---|---|---|---|
| 2009/0286462 | A1 | 11/2009 | Goto |
| 2012/0129444 | A1 | 5/2012 | Kober et al. |
| 2018/0022180 | A1* | 1/2018 | Lin ...................... B60H 1/3421 454/155 |
| 2019/0001791 | A1* | 1/2019 | Matsuzawa .......... B60H 1/3428 |
| 2020/0207186 | A1* | 7/2020 | Nemoto ................ B60H 1/345 |

FOREIGN PATENT DOCUMENTS

| | | |
|---|---|---|
| CN | 109551991 A | 4/2019 |
| DE | 4011085 A1 | 10/1990 |
| DE | 102010047817 A1 | 4/2012 |
| GB | 2232760 A | 12/1990 |
| JP | 110-250357 A | 9/1998 |
| JP | 2002-192939 A | 7/2002 |
| KR | 10-2003-0031219 A | 4/2003 |
| KR | 10-2007-0047130 A | 5/2007 |
| KR | 2014000371 U * | 1/2014 ............... B60H 1/24 |

OTHER PUBLICATIONS

Noh, H.K., KR20140000371 Translation.pdf, "An air vent knob for a vehicle", Jan. 2014, pp. 1-4.*
International Search Report and Written Opinion for PCT/KR2020/018019 mailed Mar. 11, 2021.
Chinese Office Action for Chinese Patent Application No. 202080085537.6 mailed on Apr. 9, 2025.

* cited by examiner

ADJUSTMENT KNOB FOR VEHICLE AIR VENT

CROSS-REFERENCE TO RELATED APPLICATIONS

This application is a 35 U.S.C. § 371 national stage application of, and claims priority to and benefit of, PCT Application No. PCT/KR2020/018019 filed on Dec. 10, 2020 entitled "ADJUSTMENT KNOB FOR VEHICLE AIR VENT," which claims priority to and benefit of Korean Patent Application No. 10-2019-0165038 filed Dec. 11, 2019, and entitled "KNOB FOR AIR VENT OF CAR," which are herein incorporated by reference in their entirety.

TECHNICAL FIELD

The present disclosure relates to an adjustment knob for a motor vehicle air vent.

BACKGROUND

An air vent for discharging a cold wind, a warm wind, or a room-temperature wind to an interior of a motor vehicle is installed in the interior of the motor vehicle. The air vent is installed on an end of an air duct for supplying a wind, which faces toward the interior of the motor vehicle. By way of example, the air vent is installed in an instrument panel installed on a front side of the interior of the motor vehicle.

A conventional air vent has a plurality of horizontal vanes and a plurality of vertical vanes, which are located at a wind discharging outlet of a housing and are rotatably installed inside the housing. The horizontal vanes are used to adjust a wind direction up and down, and the vertical vanes are used to adjust the wind direction left and right. To rotate the horizontal vanes and the vertical vanes, an adjustment knob is installed at the middle of one of the horizontal vanes so as to be movable in a horizontal direction, and is connected to the vertical vane. The adjustment knob is connected to the vertical vane by a vane rotating portion provided at a rear side of the adjustment knob.

As a passenger in the motor vehicle moves the adjustment knob left and right, the vane rotating portion of the adjustment knob rotates the vertical vanes left and right, and the wind direction can be adjusted left and right thereby. As the passenger moves the adjustment knob up and down, the adjustment knob rotates the horizontal vanes up and down, and the wind direction can be adjusted up and down.

SUMMARY

One embodiment of the present disclosure provides an adjustment knob for a motor vehicle air vent, which is simply and easily coupled to a horizontal vane of an air vent while being connected to a vertical vane of the air vent. One embodiment of the present disclosure provides an adjustment knob for a motor vehicle air vent that does not cause the phenomenon of separation from the horizontal vane of the air vent due to a force applied during manipulation of the adjustment knob. One embodiment of the present disclosure provides an adjustment knob for a motor vehicle air vent that maintains contact with the horizontal vane of the air vent and does not generates a noise such as an impact sound.

An adjustment knob for a motor vehicle air vent according to one embodiment of the present disclosure rotates a horizontal vane and a vertical vane which are installed in a housing of an air vent. The adjustment knob for a motor vehicle air vent according to one embodiment includes a knob body and a vane rotating portion. The knob body is configured to be coupled to the horizontal vane so as to be movable in a horizontal direction. An inserting gap, into which the horizontal vane is inserted in a frontward direction, and a receiving gap, which is enlarged from the inserting gap, are penetrated through the knob body in the horizontal direction.

The vane rotating portion is configured to rotate the vertical vane by a movement of the knob body. The vane rotating portion is fixed to a rear end of the knob body below the inserting gap, and is connected to the vertical vane. The knob body is coupled to the horizontal vane such that a front end of the horizontal vane is positioned in the receiving gap and the vane rotating portion is adjacent to a rear end of the horizontal vane.

In one embodiment, the horizontal vane has, in an upper surface thereof, a guide hole formed in the horizontal direction, and the knob body has a first guide protrusion protruding from the rear end of the knob body above the inserting gap and inserted into the guide hole.

In one embodiment, the horizontal vane has, in a lower surface thereof, a guide groove formed in the horizontal direction, and the knob body has a second guide protrusion protruding upward from a lower surface of the inserting gap and inserted into the guide groove.

In one embodiment, the knob body includes an upper coupling portion and a lower coupling portion, which are elastically deformable in a vertical direction and are coupled to the horizontal vane in the vertical direction. The inserting gap and the receiving gap are defined between the upper coupling portion and the lower coupling portion, and the vane rotating portion is fixed to a rear end of the lower coupling portion.

In one embodiment, the horizontal vane has, at the rear end thereof, a recess formed in the horizontal direction, and the knob body has an engagement protrusion protruding from the rear end of the lower coupling portion toward the inserting gap. The engagement protrusion is inserted into the recess to prevent the knob body from being separated in the frontward direction.

In one embodiment, the adjustment knob for a motor vehicle air vent includes an elastic member coupled to the receiving gap. The elastic member is configured to make contact with a surface of the receiving gap at an outer peripheral surface thereof and to face toward the front end of the horizontal vane at an inner peripheral surface thereof.

In one embodiment, the knob body has, in the surface of the receiving gap, at least one fitting protrusion. The elastic member has, in an outer peripheral surface thereof, a fitting groove into which the fitting protrusion is fitted.

In one embodiment, the air vent has a molding member positioned in front of the horizontal vane and fixed to the housing in the horizontal direction. The knob body is coupled to the horizontal vane such that the molding member passes through the receiving gap in the horizontal direction between the front end of the horizontal vane and the inner peripheral surface of the elastic member. The elastic member is configured to make contact with the molding member at the inner peripheral surface thereof when the knob body is rotated upward and downward.

In one embodiment, the adjustment knob for a motor vehicle air vent includes a decorative member coupled to the front end of the knob body. The knob body has a through-hole formed to communicate with the receiving gap, and the decorative member has a fitting protrusion fitted into the through-hole.

According to one embodiment of the present disclosure, by pushing the knob body, to which the vane rotating portion is coupled, to the horizontal vane of the air vent, the knob body can be installed at the horizontal vane so as to be operable, and the adjustment knob is connected to the vertical vane. Accordingly, the adjustment knob for a motor vehicle air vent according to one embodiment can be simply and easily installed at the horizontal vane of the air vent.

According to one embodiment of the present disclosure, the knob body can be slidably movable along the horizontal vane, and can be stably coupled to the horizontal vane without separation caused by an external force.

According to one embodiment of the present disclosure, due to the elastic member installed in the knob body, the operation feel of the knob body can be enhanced, and the generation of a noise such as an impact sound can be prevented during the upward and downward rotation of the knob body.

In a use example where a molding member for enhancing an aesthetic feel of the air vent is fixed to the housing of the air vent, the adjustment knob for a motor vehicle air vent according to one embodiment can be installed at the horizontal vane with the molding member received in the adjustment knob, and can exhibit enhanced operability.

BRIEF DESCRIPTION OF THE DRAWINGS

FIG. 5 is a rear perspective view showing the elastic member of the adjustment knob according to one embodiment.

DETAILED DESCRIPTION

Embodiments of the present disclosure are illustrated for the purpose of explaining the technical idea of the present disclosure. The scope of the rights according to the present disclosure is not limited to the embodiments presented below or the detailed descriptions of such embodiments.

All the technical terms and scientific terms used in the present disclosure include meanings that are commonly understood by those of ordinary skill in the art unless otherwise defined. All terms used in the present disclosure are selected for the purpose of describing the present disclosure more clearly, and are not selected to limit the scope of the rights according to the present disclosure.

Expressions such as "comprising," "including," "having," and the like used in the present disclosure are to be understood as open-ended terms having the possibility of encompassing other embodiments, unless otherwise mentioned in the phrase or sentence containing such expressions.

In the present disclosure, the description that one element is "connected," "coupled," or "fixed" to another element should be understood to indicate that the one element may be directly connected, coupled, or fixed to the another element, or should be further understood to indicate that a new element may be interposed between the one element and the another element.

Figure 1:
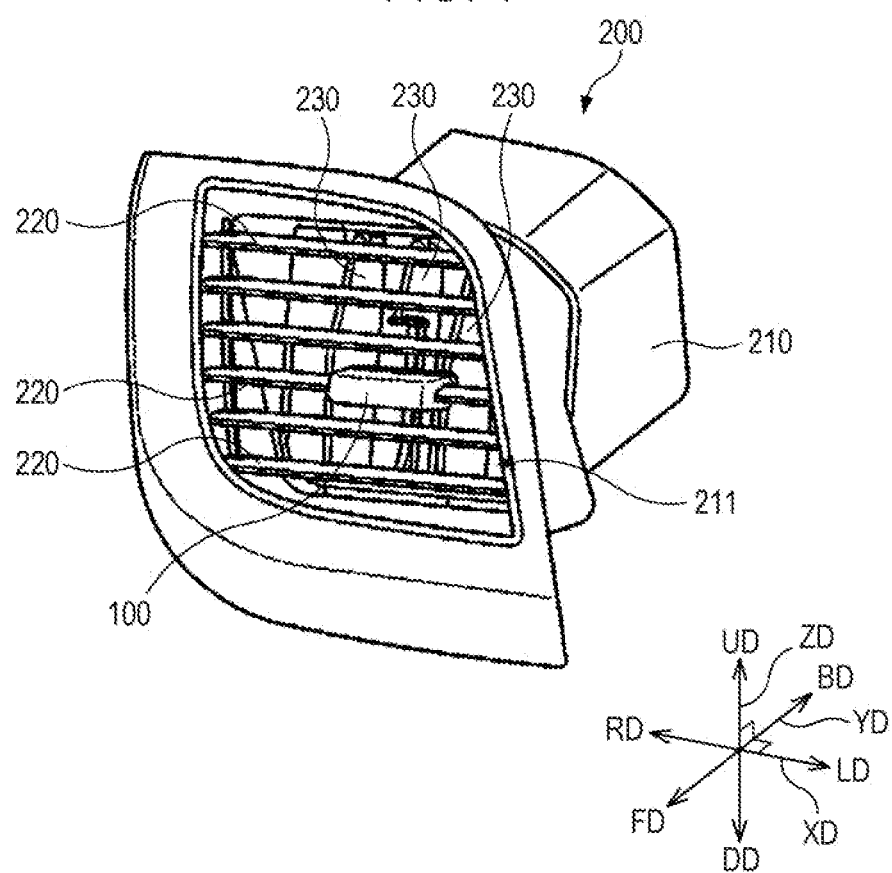
FIG. 1 is a perspective view schematically showing a motor vehicle air vent according to one embodiment and an adjustment knob for a motor vehicle air vent according to one embodiment.

A frontward direction, a rearward direction, an upward direction, a downward direction, a leftward direction, and rightward direction used in the present disclosure correspond to the directions of the arrows indicated by reference symbols FD, BD, UD, DD, LD and RD, respectively, shown in FIG. 1. A horizontal direction XD used in the present disclosure includes the leftward direction LD and the rightward direction RD. A frontward and rearward direction YD used in the present disclosure includes the frontward direction FD and the rearward direction BD. A vertical direction ZD used in the present disclosure includes the upward direction UD and the downward direction DD. The frontward direction FD means a direction toward an interior of a motor vehicle, and other directions may be defined with reference to the frontward direction FD. The above-mentioned directions are merely given to describe the present disclosure for clear understanding thereof, and the respective directions may be defined differently depending on where the reference is placed.

Descriptions are made hereinafter for the embodiments of the present disclosure with reference to the accompanying drawings. Like reference numerals in the drawings denote like or corresponding elements.

FIG. 1 is a perspective view showing a motor vehicle air vent in which an adjustment knob for a motor vehicle air vent according to one embodiment is installed. FIG. 1 schematically shows a motor vehicle air vent (hereinafter simply referred to as an air vent) according to one embodiment and an adjustment knob for a motor vehicle air vent (hereinafter simply referred to as an adjustment knob) according to one embodiment.

Referring to FIG. 1, the air vent 200 for discharging a warm wind, a cold wind, or a room-temperature wind to an interior of a motor vehicle includes a housing 210. The housing 210 has a passage therein, through which a wind flows. A warm wind, a cold wind, or a room-temperature wind is discharged to the interior of the motor vehicle through a discharging outlet 211 formed in a front end of the housing 210.

The air vent 200 may have a plurality of horizontal vanes 220 and a plurality of vertical vanes 230 which are installed at the discharging outlet 211 of the housing 210. The plurality of horizontal vanes 220 are installed in the housing 210 so as to be rotated in an upward direction UD and a downward direction DD, and adjust, in the vertical direction ZD, a wind direction of the wind discharged from the discharging outlet. The plurality of horizontal vanes 220 are connected to one another by a first link member (not shown) disposed in a vertical direction.

Along with the upward or downward rotation of one horizontal vane 220, the remaining horizontal vanes are rotated upward or downward by the first link member. The plurality of vertical vanes 230 are located behind the horizontal vanes 220. The plurality of vertical vanes 230 are installed in the housing 210 so as to be rotated in a leftward direction LD and a rightward direction RD, and adjust, in the horizontal direction XD, the wind direction of the wind discharged from the discharging outlet. The plurality of vertical vanes 230 are connected to one another by a second link member (not shown) disposed in the horizontal direction. Along with the leftward or rightward rotation of one vertical vane 230, the remaining vertical vanes are rotated leftward or rightward by the second link member.

The horizontal vanes 220 and the vertical vanes 230 are rotated by the adjustment knob 100 according to one embodiment. The horizontal vanes 220 and the vertical vanes 230 are rotated by the adjustment knob 100, and the wind direction of the wind discharged from the discharging outlet can be adjusted thereby.

The adjustment knob 100 is coupled to one horizontal vane 220 among the plurality of horizontal vanes. The adjustment knob 100 is coupled to the horizontal vane 220 so as to be movable, specifically, slidable in the horizontal direction XD. The adjustment knob 100 is coupled to the horizontal vane 220 so that the position thereof in the horizontal direction XD can be changed. However, the position of the adjustment knob in the vertical direction ZD is not changed with respect to the horizontal vane 220. Thus, as a passenger pushes or rotates the adjustment knob 100 in the upward direction UD or the downward direction DD, the horizontal vane 220 with the adjustment knob 100 coupled thereto is rotated in the upward direction UD or the downward direction DD, and the remaining horizontal vanes 220 are rotated in the upward direction UD or the downward direction DD by the first link member.

The adjustment knob 100 is connected to one vertical vane 230 among the plurality of vertical vanes. As the adjustment knob 100 is moved in the leftward direction LD or the rightward direction RD in the state of being coupled to the horizontal vane 220, the vertical vane 230 with the adjustment knob 100 connected thereto is rotated in the leftward direction LD or the rightward direction RD, and the remaining vertical vanes 230 are rotated in the leftward direction LD or the rightward direction RD by the second link member.

Figure 2:
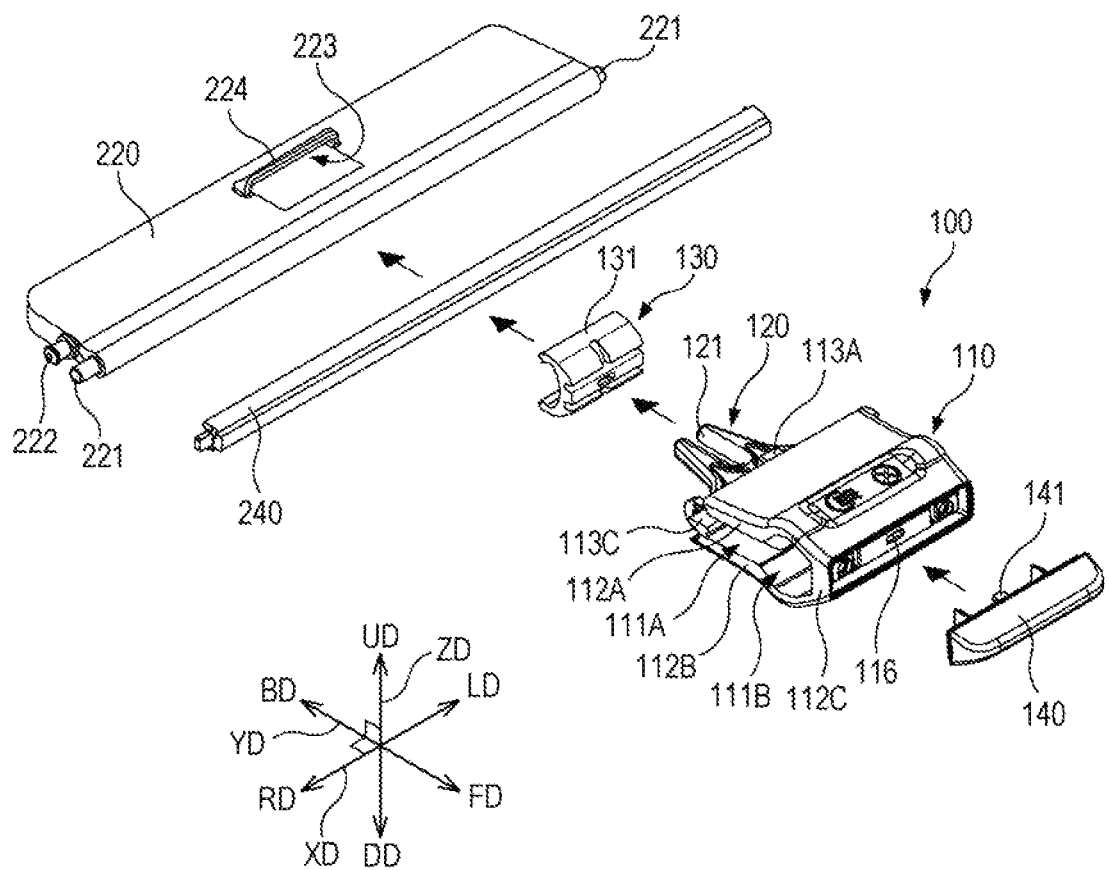
FIG. 2 is an exploded perspective view showing a horizontal vane of an air vent and an adjustment knob according to one embodiment.
Figure 3:
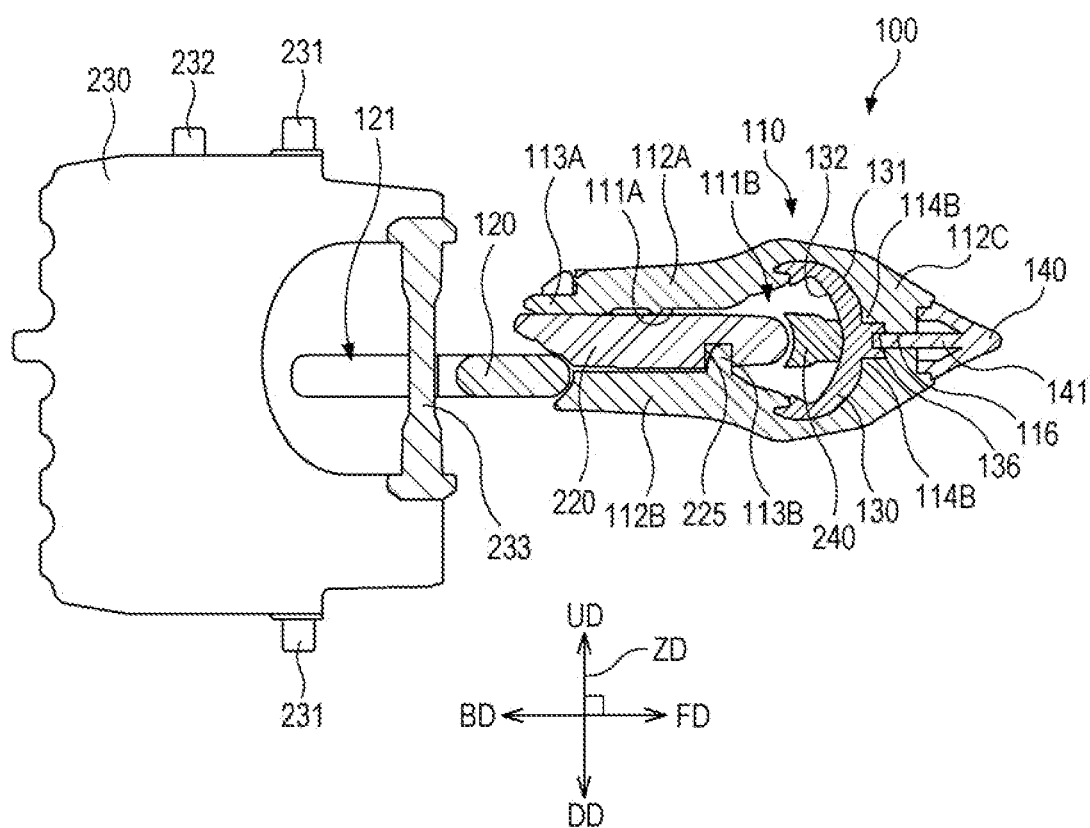
FIG. 3 is a cross-sectional view showing a horizontal vane and a vertical vane of an air vent and an adjustment knob according to one embodiment.
Figure 4:
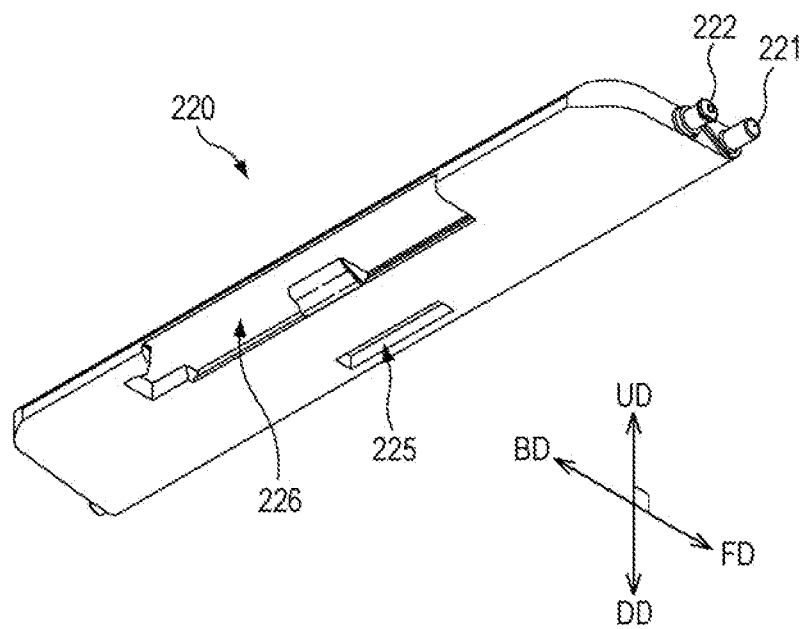
FIG. 4 is a lower perspective view of a horizontal vane of an air vent.
Figure 5:
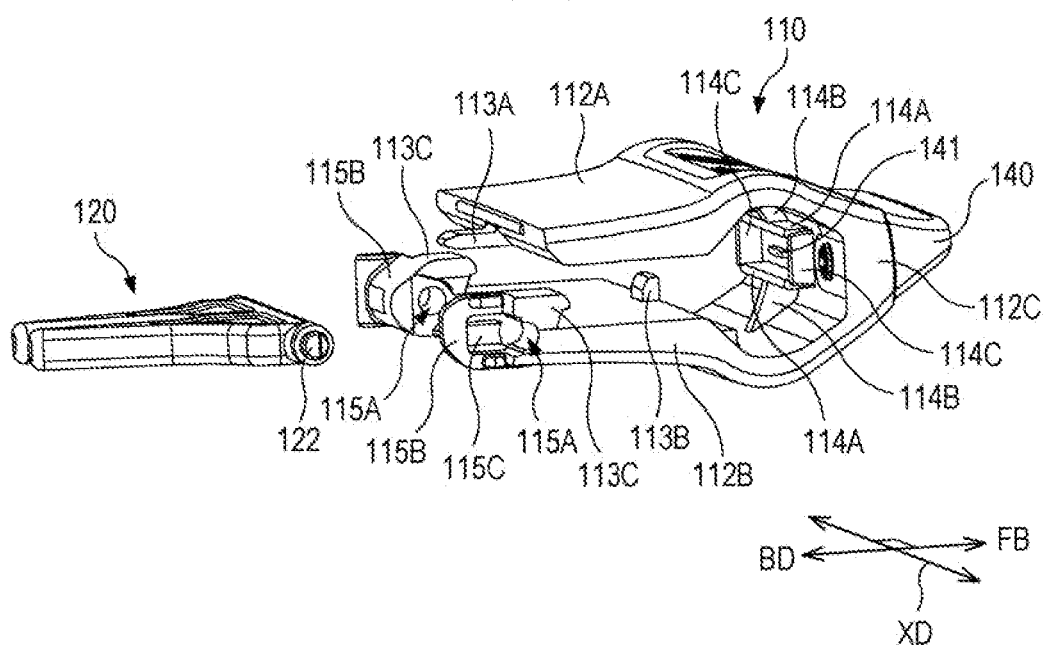
FIG. 5 is a rear perspective view showing a knob body and a vane rotating portion of an adjustment knob according to one embodiment.
Figure 6:
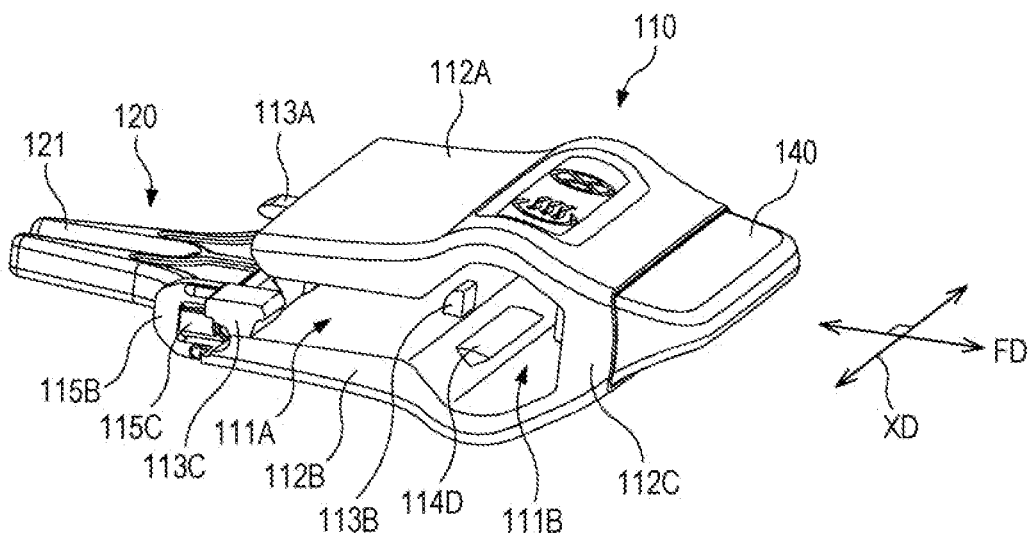
FIG. 6 is a front perspective view showing the knob body and the vane rotating portion of the adjustment knob according to one embodiment.
Figure 7:
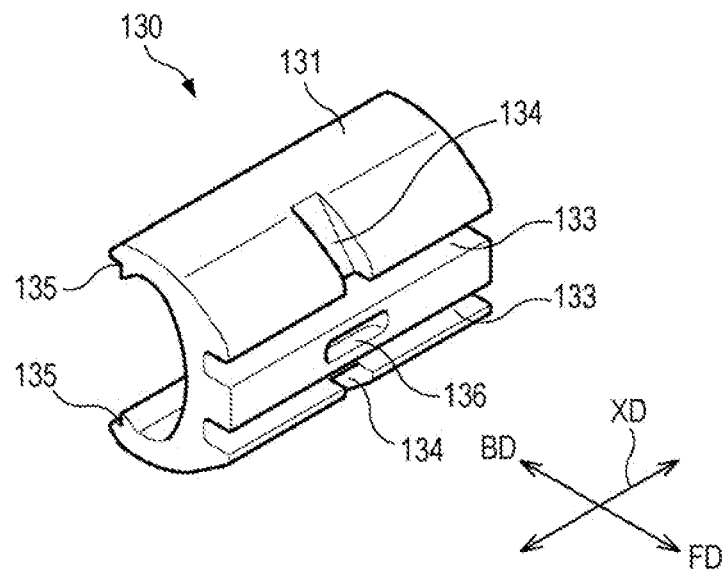
FIG. 7 is a front perspective view showing an elastic member of the adjustment knob according to one embodiment.
Figure 8:
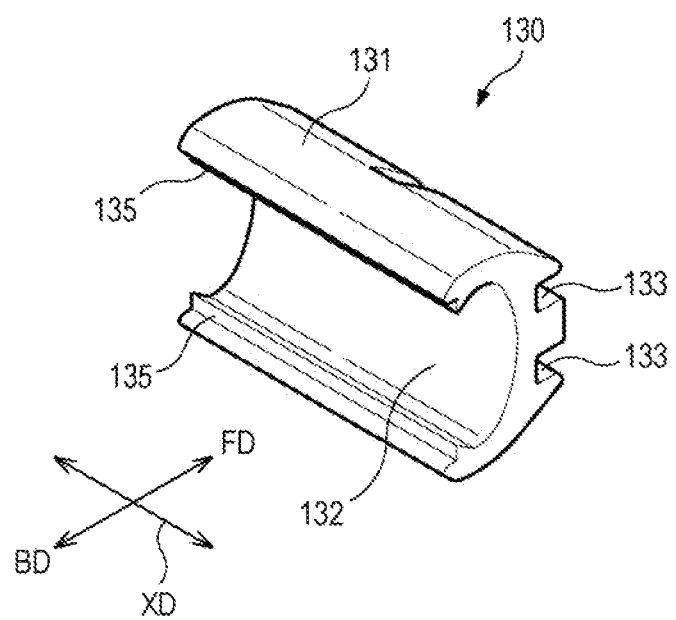

FIG. 2 is an exploded perspective view showing the horizontal vane of the air vent and the adjustment knob according to one embodiment, and FIG. 3 is a cross-sectional view showing the horizontal vane and the vertical vane of the air vent and the adjustment knob according to one embodiment. FIG. 4 is a lower perspective view of the horizontal vane of the air vent according to one embodiment. FIGS. 5 and 6 are perspective views showing a knob body and a vane rotating portion of the adjustment knob according to one embodiment. FIGS. 7 and 8 are perspective views showing an elastic member of the adjustment knob according to one embodiment.

Referring to FIGS. 2 and 3, the adjustment knob 100 is coupled to one horizontal vane 220 among the plurality of horizontal vanes of the air vent, and is connected to one vertical vane 230 among the plurality of vertical vanes of the air vent in the state of being coupled to the horizontal vane 220. As shown in FIG. 2, the horizontal vane 220 has a pair of rotation shafts 221 in the vicinity of its front end, and is rotatably coupled to the housing of the air vent at the rotation shafts 221. The horizontal vane 220 and the adjustment knob 100 coupled to the horizontal vane are rotatable in the vertical direction ZD about the rotation shafts 221 of the horizontal vane. The horizontal vane 220 has a link shaft 222 behind the rotation shaft 221, and the above-described first link member is connected to the link shaft 222. As shown in FIG. 3, the vertical vane 230 has a rotation shaft 231 at an upper end and a lower end thereof, and is rotatably coupled to the housing of the air vent at the rotation shafts 231. The vertical vane 230 has a link shaft 232 at the upper end thereof, and the above-described second link member is connected to the link shaft 232. Further, the vertical vane 230 has a link pin 233, and the link pin 233 is connected to a portion of the adjustment knob 100 (e.g., a vane rotating portion of the adjustment knob to be described below).

The adjustment knob 100 includes a knob body 110 configured to be movably coupled to the horizontal vane 220, and a vane rotating portion 120 configured to rotate the vertical vane 230 by a movement of the knob body 110.

The knob body 110 is a portion of the adjustment knob 100 which a passenger in a motor vehicle can manipulate for adjustment of the wind direction. The knob body 110 is coupled to the horizontal vane 220 so as to be slidable in the horizontal direction XD. The knob body 110 is coupled to the horizontal vane 220 in a way of making contact with the horizontal vane 220 in the vertical direction ZD, i.e., in a way of making contact with an upper surface of the horizontal vane 220 and making contact with a lower surface of the horizontal vane 220.

The knob body 110 may be coupled to the horizontal vane 220 in such a way that the knob body is fitted to the horizontal vane 220 in the rearward direction BD while surrounding a front end, the upper surface, and the lower surface of the horizontal vane 220. The knob body 110 has a gap penetrated in the horizontal direction XD therein, and a portion of the horizontal vane 220 in the horizontal direction is inserted into and received in the gap.

The knob body 110 has an inserting gap 111A and a receiving gap 111B as the aforementioned gap for connection of the knob body 110 and the horizontal vane 220. The inserting gap 111A is penetrated through the knob body 110 in the horizontal direction XD from a rear end of the knob body toward a front end of the knob body. The horizontal vane 220 is inserted into the inserting gap 111A in the frontward direction FD. The receiving gap 111B extends in the frontward direction FD from the inserting gap 111A, and communicates with the inserting gap 111A. The receiving gap 111B is enlarged from the inserting gap 111A. The receiving gap 111B is penetrated through the knob body 110 in the horizontal direction XD from the inserting gap 111A toward the front end of the knob body 110.

The adjustment knob 100 is configured to be coupled to the horizontal vane 220 at once through a simple work, by pushing the knob body 110 to the horizontal vane 220 in the rearward direction BD. Thus, the horizontal vane 220 is inserted into the inserting gap 111A in the frontward direction FD. In the state where the knob body is coupled to the horizontal vane as shown in FIG. 3, the knob body 110 is movably coupled to the horizontal vane 220 such that the front end of the horizontal vane 220 is positioned in the receiving gap 1111B.

Since the inserting gap 111A and the receiving gap 111B are penetrated through the knob body 110 in the horizontal direction, the knob body 110 has an approximately U-shape when the knob body 110 is viewed from a lateral side. Thus, the knob body 110 includes an upper coupling portion 112A and a lower coupling portion 112B which are elastically deformable in the vertical direction. The upper coupling portion 112A and the lower coupling portion 112B are connected to each other by a connection portion 112C located at the front end of the knob body 110, and are elastically deformable so as to move away from or approach each other about the connection portion 112C.

The inserting gap 111A and the receiving gap 111B are defined between the upper coupling portion 112A and the lower coupling portion 112B. Thus, when the adjustment knob is coupled to the horizontal vane as shown in FIG. 3, the upper coupling portion 112A and the lower coupling portion 112B are coupled to and in contact with a portion of the horizontal vane 220 except the portion adjacent to the front end of the horizontal vane 220.

The knob body 110 is slidable in the horizontal direction XD along the horizontal vane 220 in the state where the upper coupling portion 112A and the lower coupling portion 112B support the horizontal vane 220 in the vertical direction (i.e., in the state where the portion of the horizontal vane 220 except the front end of the horizontal vane 220 is inserted into the inserting gap 111A). With regard to the positional fixing in a frontward and rearward direction and the slidable movement in the horizontal direction between the knob body 110 and the horizontal vane 220, a fitting structure using a protrusion and a groove is provided in the knob body 110 and the horizontal vane 220.

The horizontal vane 220 has, in the upper surface thereof, a guide hole 223 formed in the horizontal direction XD. The guide hole 223 may be defined between a bracket 224 protruding from the upper surface of the horizontal vane and the upper surface of the horizontal vane. The knob body 110 has a first guide protrusion 113A inserted into the guide hole 223 of the horizontal vane. The first guide protrusion 113A is located above the inserting gap 111A, and protrudes from the rear end of the knob body 110 (a rear end of the upper coupling portion 112A) in the rearward direction BD.

The horizontal vane 220 has, in the lower surface thereof, a guide groove 225 (see FIG. 4) formed in the horizontal direction XD. The guide groove 225 is located in the vicinity of the front end of the horizontal vane. The knob body 110 has a second guide protrusion 113B inserted into the guide groove 225 of the horizontal vane. The second guide protrusion 113B is located in the inserting gap 111A. The second guide protrusion 113B protrudes upward from a lower surface of the inserting gap 111A (i.e., an upper surface of the lower coupling portion 112B defining the inserting gap).

Further, the horizontal vane 220 has, in the lower surface adjacent to the rear end thereof, a recess 226 (see FIG. 4) formed in the horizontal direction XD. The knob body 110 has, at the rear end thereof, a pair of engagement protrusions 113C (see FIG. 5) inserted into the recess 226.

The engagement protrusions 113C protrude from the rear end of the knob body 110 (specifically, a rear end of the lower coupling portion 112B) toward the inserting gap 111A. Front end surfaces of the engagement protrusions 113C are inclined in the frontward direction, and a surface of the recess 226 corresponding to the front end surfaces of the engagement protrusions is inclined in the frontward direction.

If the horizontal vane 220 is inserted between the upper coupling portion 112A and the lower coupling portion 112B in the frontward direction FD, i.e., is inserted into the inserting gap 111A in the frontward direction FD, the first guide protrusion 113A is inserted into the guide hole 223, and the second guide protrusion 113B is inserted into the guide groove 225. Within the range defined by the guide hole 223, the knob body 110 can slide in the horizontal direction XD along the horizontal vane 220. Further, if the knob body 110 is coupled to the horizontal vane 220, the engagement protrusions 113C are inserted into the recess 226. The engagement protrusions 113C can be engaged with the front surface of the recess 226 in the frontward direction FD. Therefore, it is possible to prevent the adjustment knob 100 from being separated in the frontward direction of the knob body 110.

In another embodiment, the knob body 110 may have the first guide protrusion 113A and the engagement protrusions 113C, the upper surface of the horizontal vane 220 and the lower surface of the upper coupling portion 112A may be in contact with each other, and the lower surface of the horizontal vane 220 and the upper surface of the lower coupling portion 112B may be in contact with each other.

By the movement of the knob body 110 in the horizontal direction, the vertical vane 230 is rotated in the horizontal direction XD. The vane rotating portion 120 fixed to the rear end of the knob body 110 rotates the vertical vane 230 in the horizontal direction XD.

The vane rotating portion 120 is formed in a fork shape, and has a slit 121 therein. The vane rotating portion 120 is fixed to the rear end of the knob body 110. The vane rotating portion 120 is connected to the vertical vane 230 such that the link pin 233 of the vertical vane is inserted into the slit 121. As the knob body 110 is moved in the horizontal direction XD, a movement force in the horizontal direction is applied to the link pin 233 through the vane rotating portion 120. Therefore, the vertical vane 230 can be rotated in the horizontal direction XD about the rotation shafts 231.

The vane rotating portion 120 is located at the rear end of the knob body 110, and is fixed to the rear end of the knob body 110 below the inserting gap 111A. The vane rotating portion 120 is spaced apart downward from the first guide protrusion 113A. Thus, the horizontal vane 220 can be inserted into the inserting gap 111A through a space formed between the first guide protrusion 113A and the vane rotating portion 120. Thus, as shown in FIG. 3, the knob body 110 is coupled to the horizontal vane 220 such that the vane rotating portion 120 is adjacent to the rear end of the horizontal vane 220.

The vane rotating portion 120 is fixed to the rear end of the lower coupling portion 112B. Referring to FIGS. 5 and 6, the knob body 110 has, at the rear end of the lower coupling portion 112B, a pair of fitting holes 115A penetrated in the horizontal direction XD. U-shaped holders 115B protruding rearward define the fitting holes 115A. An elastic piece 115C protruding frontward is provided in one of the holders 115B. The vane rotating portion 120 has, at a front end thereof, a pair of fitting protrusions 122 protruding in the horizontal direction. If the vane rotating portion 120 is inserted into the lower coupling portion 112B in the frontward direction, each fitting protrusion 122 is fitted into the fitting hole 115A, and the vane rotating portion 120 can be fixed to the rear end of the lower coupling portion 112B.

Referring to FIGS. 2 and 3, the adjustment knob according to one embodiment includes an elastic member 130 that is coupled to the receiving gap 111B of the knob body. The elastic member 130 is configured to make contact with the surface of the receiving gap 111B at an outer peripheral surface 131 thereof and to face toward the front end of the horizontal vane 220 at an inner peripheral surface 132 thereof. The elastic member 130 is formed of a material having a self-elastic force, such as rubber. When the elastic member 130 is viewed from a lateral side, the elastic member 130 has an approximately C-shape. Thus, the elastic member 130 is formed in a shape corresponding to the shape of the receiving gap 111B of the knob body. The elastic member 130 makes contact with the surface of the receiving gap 111B at the entirety of the outer peripheral surface 131, and faces toward the front end of the horizontal vane 220 at the inner peripheral surface 132.

The elastic member 130 may be fixed to the receiving gap 111B of the knob body through fitting. With regard to the fitting configuration between the knob body and the elastic member, reference is made to FIGS. 5 to 8.

The knob body 110 has, in the surface of the receiving gap 111B, a pair of fitting protrusions 114A formed in the horizontal direction XD. The elastic member 130 has, in the outer peripheral surface 131, a pair of fitting grooves 133 into which the fitting protrusions 114A are fitted respectively. As another example, one fitting protrusion 114A may be provided in the surface of the receiving gap 111B, and one fitting groove 133 may be provided in the outer peripheral surface 131 of the elastic member 130.

The knob body 110 has a rib protrusion 114B between the fitting protrusion 114A and the surface of the receiving gap 111B. The elastic member 130 has a rib groove 134 in the outer peripheral surface 131, and the rib groove 134 is formed from the middle of the fitting groove 133 in a circumferential direction of the elastic member 130. If the elastic member 130 is coupled to the receiving gap 111B of the knob body, the rib protrusion 114B is inserted into the rib groove 134.

The knob body 110 has a pair of positioning protrusions 114C in the surface of the receiving gap 111B. A distance between the pair of positioning protrusions 114C corresponds to a length of the elastic member 130 in the horizontal direction. Thus, the elastic member 130 can be fitted between the positioning protrusions 114C.

The elastic member 130 has, at each end portion thereof, a concave groove 135 formed in the horizontal direction XD. The knob body 110 has, in the surface of the receiving gap 111B, a pair of stepped protrusions 114D fitted into the concave grooves 135 of the elastic member 130, respectively. The stepped protrusions 114D are formed in the horizontal direction in the surface of the receiving gap 111B.

The elastic member 130 may be coupled to the receiving gap 111B in a lateral direction in a state where the upper coupling portion 112A and the lower coupling portion 112B are slightly spread apart from each other or maintain the inserting gap 111A. The elastic member 130 is fixed to and installed in the receiving gap 111B of the knob body such that the pair of fitting protrusions 114A of the knob body are inserted into the fitting grooves 133 of the elastic member and the elastic member 130 is inserted between the pair of positioning protrusions 114C of the knob body.

The elastic member 130 faces toward the front end of the horizontal vane 220 at the inner peripheral surface 132 located opposite to the outer peripheral surface 131 which is in contact with the surface of the receiving gap. When the elastic member 130 is viewed from a lateral side, the elastic member 130 is formed in a shape in which the inner peripheral surface 132 thereof surrounds the front end of the horizontal vane 220. The elastic member 130 may be coupled to the receiving gap of the knob body such that the elastic member is in contact with the front end of the horizontal vane 220 at the inner peripheral surface 132 thereof or is spaced apart from the front end of the horizontal vane 220 with a slight gap. When the knob body is moved leftward and rightward or rotated upward and downward, the elastic member 130 may come into contact with the front end of the horizontal vane 220 at the inner peripheral surface 132.

Referring to FIGS. 2 and 3, the air vent according to one embodiment includes a molding member 240 for enhancing an aesthetic feel at the discharging outlet of the air vent. The molding member 240 has a bar shape and may be formed to have a silver color. The molding member 240 is fixed to the housing of the air vent in the horizontal direction XD so as to be located in front of the horizontal vane 220. Where the air vent has the molding member 240 as described above, the adjustment knob according to one embodiment is installed at the horizontal vane 220 such that the knob body 110 surrounds the horizontal vane 220 and the molding member 240.

If the knob body 110 is coupled to the horizontal vane 220, the molding member 240 is positioned in front of the front end of the horizontal vane 220 and is positioned in the receiving gap 111B of the knob body. That is, the knob body 110 is coupled to the horizontal vane 220 such that the molding member 240 passes through the receiving gap 111B in the horizontal direction XD between the front end of the horizontal vane 220 and the inner peripheral surface 132 of the elastic member 130.

If the knob body 110 is coupled to the horizontal vane 220, the inner peripheral surface 132 of the elastic member 130 may make contact with a surface of the molding member 240. Alternatively, the inner peripheral surface 132 of the elastic member 130 may be spaced apart from the surface of the molding member 240 with a slight gap. When the adjustment knob 100 is moved in the horizontal direction, the inner peripheral surface 132 of the elastic member 130 may come into contact with the surface of the molding member 240, and the elastic member 130 may impart a frictional resistance to the knob body 110. Thus, when the passenger in a motor vehicle moves, in the horizontal direction, the knob body 110 having the elastic member 130, the adjustment knob 100 having the elastic member 130 can impart an enhanced operation feel to the passenger. Further, when the adjustment knob 100 is moved in the horizontal direction, the elastic member 130 can guide the movement of the knob body 110, and the elastic member 130 can improve the shaking of the knob body 110.

Further, the elastic member 130 is configured to make contact with the molding member 240 at the inner peripheral surface 132 thereof when the knob body 110 is rotated upward and downward. Since the elastic member 130 is in contact with the molding member 240, the generation of a noise such as an impact sound or a friction sound can be prevented between the knob body and the molding member during the upward and downward rotation of the knob body 110. As shown in FIG. 3, the elastic member 130 may be formed such that both ends thereof are positioned above and below the molding member 240 respectively, or such that both ends thereof are positioned more rearward than the molding member 240. As the knob body 110 coupled to the horizontal vane 220 is pushed upward or downward, the horizontal vane 220 and the knob body 110 are rotated upward or downward about the rotation shafts 221 of the horizontal vane 220. The molding member 240 is fixed to the housing of the air vent and is not moved. Thus, when the knob body 110 is rotated upward and downward, the molding member 240 can slide along the inner peripheral surface 132 while being in contact with the inner peripheral surface 132 of the elastic member 130, or can make contact with the inner peripheral surface 132 of the elastic member 130. Since the knob body 110 makes contact with the molding member 240 through the elastic member 130 during the upward and downward rotation of the knob body 110, the generation of a noise can be prevented.

Referring to FIGS. 2 and 3, the adjustment knob 100 according to one embodiment may include a decorative member 140 coupled to the front end of the knob body 110. The decorative member 140 may be coupled to the connection portion 112C of the adjustment knob 100. The decorative member 140 has a fitting protrusion 141 inserted into the inside of the knob body 110. The knob body 110 has a through-hole 116 through which the fitting protrusion 141 passes. The through-hole 116 is formed to penetrate through the connection portion 112C, and communicates with the receiving gap 111B. Further, as shown in FIG. 7, the elastic member 130 has, in the outer peripheral surface 131 thereof, a fitting hole 136 aligned with the through-hole 116. The fitting hole 136 is formed between the pair of fitting grooves 133. If the decorative member 140 is coupled to the front end of the knob body 110 as shown in FIG. 3, the fitting protrusion 141 is fitted into the through-hole 116 and is also fitted into the fitting hole 136 through the through-hole 116. The through-hole 116 of the knob body and the fitting hole 136 of the elastic member may have the same dimension. As the fitting protrusion 141 of the decorative member is fitted into the fitting hole 136 through the through-hole 116, the elastic member 130 may be fixed to the knob body 110 and the decorative member 140.

An example where the adjustment knob according to one embodiment is assembled and an example where the adjustment knob according to one embodiment is installed at the horizontal vane of the air vent are described below with reference to FIGS. 2 and 3.

The molding member 240 for enhancing the aesthetic feel of the air vent is fixed to the housing of the air vent so as to be located in front of the horizontal vane 220. The vane rotating portion 120 for rotating the vertical vane may be fixed to the rear end of the lower coupling portion 112B of the knob body. Therefore, the vane rotating portion 120 and the knob body 110 can be provided as a single unit. The elastic member 130 may be coupled to the receiving gap 111B in the lateral direction.

The knob body 110, in which the elastic member 130 and the vane rotating portion 120 are installed, is pushed in the rearward direction BD to the molding member 240 and the horizontal vane 220 located behind the molding member 240. Therefore, the molding member 240 and the horizontal vane 220 are inserted into the inserting gap 111A in the frontward direction FD, and the molding member 240 and the front end of the horizontal vane 220 are positioned in the receiving gap 111B. As the knob body 110 is pushed to the horizontal vane 220 in the rearward direction BD, the guide protrusion 112A provided in the upper coupling portion 112A is inserted into the guide hole 223 of the horizontal vane 220, and the second guide protrusion 112B provided in the inserting gap 111A is inserted into the guide groove 225 of the horizontal vane 220. Further, as the knob body 110 is pushed to the horizontal vane 220 in the rearward direction BD, the vane rotating portion 120 protruding from the lower coupling portion 112B is positioned at the rear end of the horizontal vane 220 beyond the lower surface of the horizontal vane 220, and the engagement protrusion 113C (see FIG. 5) of the lower coupling portion 112B is inserted into the recess 226 (see FIG. 4) of the horizontal vane 220.

If the knob body 110 is coupled to the horizontal vane 220, the molding member 240 is positioned in the receiving gap 111B of the knob body in front of the horizontal vane 220. Further, the front end of the horizontal vane 220 is positioned in the receiving gap 111B behind the molding member 240, a portion of the horizontal vane 220 except the front end of the horizontal vane is positioned between the upper and lower coupling portions 112A and 112B (in the inserting gap 111A), and the vane rotating portion 120 is connected to the vertical vane 230. By the work of pushing the knob body 110 to the horizontal vane 220 as described above, the adjustment knob 100 having the vane rotating portion can be installed at the horizontal vane 220 at once with a simple work.

After the knob body 110 is installed at the horizontal vane 220, the decorative member 140 may be coupled to the knob body 110 such that the fitting protrusion 141 of the decorative member 140 is fitted into the fitting hole 136 (see FIG. 7) of the elastic member 130 through the through-hole 116. Therefore, the assembly and installation of the adjustment knob 100 can be completed.

As the passenger in a motor vehicle moves the adjustment knob 100 in the leftward direction LD or the rightward direction RD, the adjustment knob 100 is slid in the leftward direction LD or the rightward direction RD along the horizontal vane 220. In the state where the first guide protrusion 112A and the second guide protrusion 112B of the knob body are respectively inserted into the guide hole 223 and the guide groove 225 of the horizontal vane, the adjustment knob 100 is slid in the leftward direction LD or the rightward direction RD. By the sliding movement of the adjustment knob 100, the vane rotating portion 120 rotates the vertical vane 230 in the leftward direction LD or the rightward direction RD. Therefore, the direction of the wind discharged from the housing of the air vent can be adjusted to the leftward direction or the rightward direction. During the sliding movement of the adjustment knob 100, the elastic member 130 may be in contact with or may maintain the contact state. Thus, the elastic member 130 can provide an enhanced operation feel to the passenger and can improve the shaking of the adjustment knob. Further, since the elastic member 130 is fixed to the knob body 110 through fitting using the protrusion and the groove, the elastic member can be fixed to the knob body 110 without separation during the movement of the adjustment knob 100.

If the passenger pushes the adjustment knob 100 in the upward direction UD or the downward direction DD, the force applied to the horizontal vane 220 through the upper coupling portion 112A or the lower coupling portion 112B rotates the horizontal vane 220 about the rotation shafts 221 in the upward direction or the downward direction. Therefore, the direction of the wind discharged from the housing of the air vent can be adjusted to the upward direction or the downward direction. Since the molding member 240 is fixed to the housing of the air vent, only the horizontal vane 220 and the adjustment knob 100 can be rotated upward and downward. Since the elastic member 130 is in contact with the molding member 240, the generation of a noise such as an impact sound can be prevented during the upward and downward movement of the adjustment knob 100.

Figure 9:
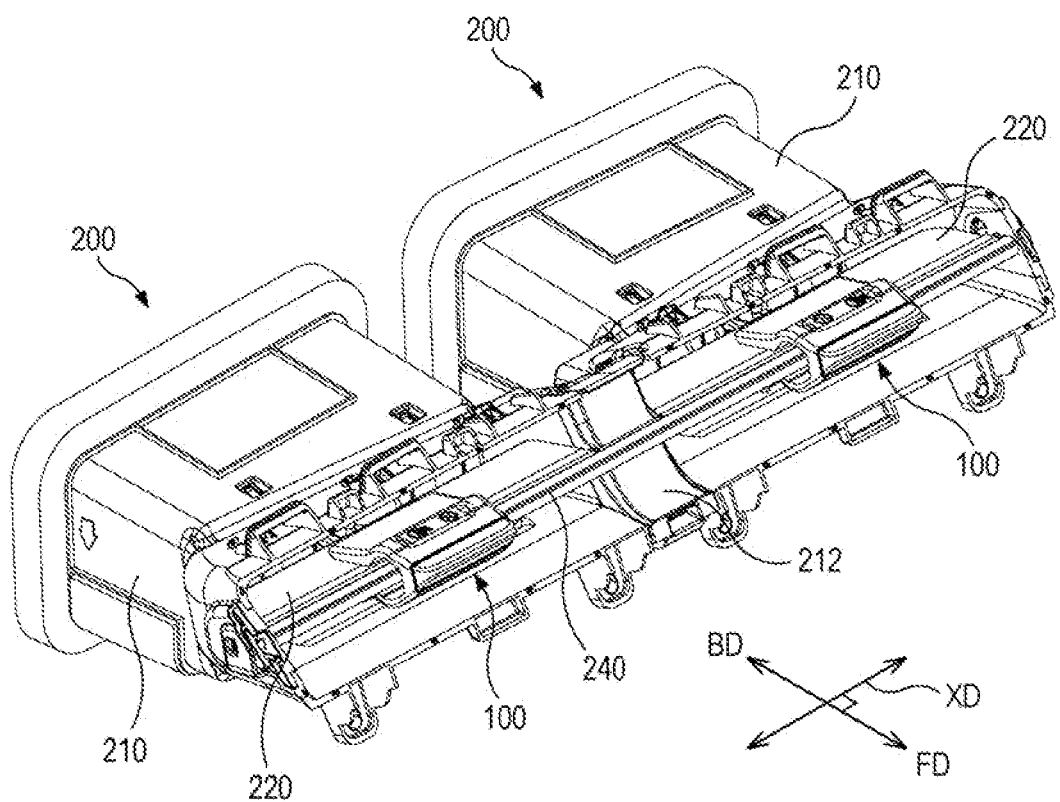
FIG. 9 is a perspective view showing another example of an air vent in which the adjustment knob according to one embodiment is installed.
Figure 10:
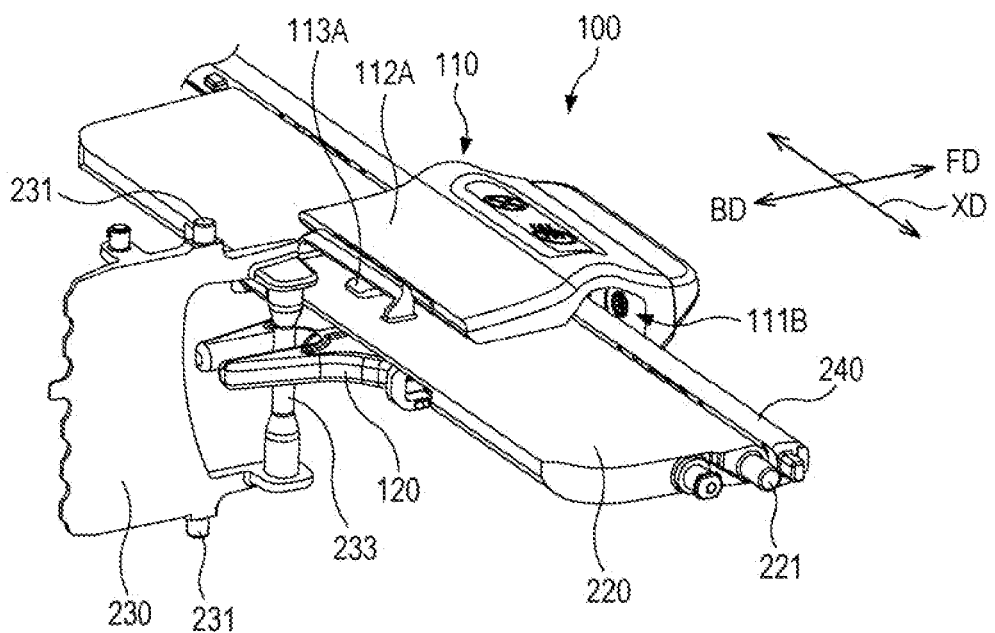
FIG. 10 is a perspective view showing a state where a horizontal vane and a vertical vane in the air vent shown in FIG. 9 and the adjustment knob according to one embodiment are coupled.

FIG. 9 is a perspective view showing another example of an air vent in which the adjustment knob according to one embodiment is installed, and FIG. 10 is a perspective view showing a state where a horizontal vane and a vertical vane in the air vent shown in FIG. 9 and an adjustment knob according to one embodiment are coupled.

Referring to FIG. 9, a pair of air vents 200 may be disposed side by side in the horizontal direction and be connected to each other. A front end portion of the housing 210 of the left air vent and a front end portion of the housing 210 of the right air vent may be connected to each other in the horizontal direction by a spacer 212. A single molding member 240 is fixed to the left housing 210 and the right housing 210. Further, the molding member 240 is fixed to the spacer 212. Thus, in the pair of air vents 200 disposed side by side, the molding member 240 and the spacer 212 are a fixed element that does not move. Due to the constraints in an interior design of a motor vehicle, a pair of air vents may be required as shown in FIG. 9, and a single, non-divided molding member 240 may be installed in the pair of air vents.

Referring to FIG. 10, in each air vent, the adjustment knob 100 is coupled to the horizontal vane 220 so as to be movable in the horizontal direction XD while supporting the horizontal vane 220 upward and downward. Further, the adjustment knob 100 is connected to one vertical vane 230 among the vertical vanes by the vane rotating portion 120.

In the state where the adjustment knob 100 is coupled to the horizontal vane 220, the molding member 240 is positioned in front of the horizontal vane 220 and passes through the receiving gap 111B of the knob body in the horizontal direction. The above-described elastic member is coupled to the receiving gap 111B of the knob body 110, and the elastic member is in contact with the surface of the molding member 240 at the inner peripheral surface thereof or is slightly spaced apart from the surface of the molding member 240. The adjustment knob 100 and the horizontal vane 220 can be rotated upward and downward about the rotation shaft 221 of the horizontal vane. The adjustment knob 100 is moved in the horizontal direction XD in the state of being coupled to the horizontal vane 220, and can rotate the vertical vane 230 leftward and rightward about the rotation shafts 231 by the vane rotating portion 120.

The adjustment knob 100 is coupled to the horizontal vane 220, by being pushed in the rearward direction BD to the molding member 240 and the horizontal vane 220 located behind the molding member 240 in the state where the vane rotating portion 120 and the above-described elastic member are installed in the knob body 110. In the state where the knob body 110 is coupled to the horizontal vane 220, the above-described inner peripheral surface of the elastic member may be in contact with the surface of the molding member 240. Due to the above-described elastic member, the adjustment knob 100 can exhibit an enhanced operation feel, can improve shaking, and can prevent generation of a noise.

The technical idea of the present disclosure has been described heretofore with reference to some embodiments and examples shown in the accompanying drawings. However, it is to be understood that various substitutions, modifications, and alterations may be made without departing from the technical idea and scope of the present disclosure that can be understood by those of ordinary skill in the technical field to which the present disclosure pertains. Further, it is to be understood that such substitutions, modifications, and alterations fall within the appended claims.

What is claimed is:

1. An adjustment knob for a motor vehicle air vent that has a housing, a horizontal vane installed in the housing and rotated by the adjustment knob, a vertical vane installed in the housing and rotated by the adjustment knob, and a molding member positioned in front of the horizontal vane and fixed to the housing in a horizontal direction, the adjustment knob comprising:

a knob body configured to be coupled to the horizontal vane so as to be movable in the horizontal direction, wherein an inserting gap, into which the horizontal vane is inserted in a frontward direction, and a receiving gap, which is enlarged from the inserting gap, are penetrated through the knob body in the horizontal direction;

a vane rotating portion configured to rotate the vertical vane by a movement of the knob body, the vane rotating portion being fixed to a rear end of the knob body below the inserting gap and connected to the vertical vane; and an elastic member coupled to the receiving gap and having an outer peripheral surface making contact with a surface of the receiving gap and an inner peripheral surface facing toward a front end of the horizontal vane, wherein the knob body is coupled to the horizontal vane such that the front end of the horizontal vane is positioned in the receiving gap and the vane rotating portion is adjacent to a rear end of the horizontal vane, wherein the knob body is coupled to the horizontal vane such that the molding member passes through the receiving gap in the horizontal direction between the front end of the horizontal vane and the inner peripheral surface of the elastic member, wherein the inner peripheral surface of the elastic member is formed so as to surround the front end of the horizontal vane and the molding member when the knob body is viewed in the horizontal direction, and is in contact with the molding member such that the molding member slides along the inner peripheral surface, and wherein, when the knob body is rotated upward and downward, the inner peripheral surface of the elastic member is in contact with the molding member fixed to the housing.

2. The adjustment knob of claim 1, wherein the horizontal vane has, in an upper surface thereof, a guide hole formed in the horizontal direction, and wherein the knob body has a first guide protrusion protruding from the rear end of the knob body above the inserting gap and inserted into the guide hole.

3. The adjustment knob of claim 2, wherein the horizontal vane has, in a lower surface thereof, a guide groove formed in the horizontal direction, and wherein the knob body has a second guide protrusion protruding upward from a lower surface of the inserting gap and inserted into the guide groove.

4. The adjustment knob of claim 1, wherein the knob body includes an upper coupling portion and a lower coupling portion, which are elastically deformable in a vertical direction and are coupled to the horizontal vane in the vertical direction, and wherein the inserting gap and the receiving gap are defined between the upper coupling portion and the lower coupling portion, and the vane rotating portion is fixed to a rear end of the lower coupling portion.

5. The adjustment knob of claim 4, wherein the horizontal vane has, at the rear end thereof, a recess formed in the horizontal direction, wherein the knob body has an engagement protrusion protruding from the rear end of the lower coupling portion toward the inserting gap, and wherein the engagement protrusion is inserted into the recess and prevents the knob body from being separated in the frontward direction.

6. The adjustment knob of claim 1, wherein the knob body has, in the surface of the receiving gap, at least one fitting protrusion, and wherein the elastic member has, in the outer peripheral surface thereof, a fitting groove into which the fitting protrusion is fitted.

7. The adjustment knob of claim 1, further comprising a decorative member coupled to the front end of the knob body, wherein the knob body has a through-hole formed to communicate with the receiving gap and the decorative member has a fitting protrusion fitted into the through-hole.

\* \* \* \* \*